Patented Mar. 11, 1952

2,588,992

UNITED STATES PATENT OFFICE 2,588,992

DENTIFRICE

Julian Robert Schlaeger, Chicago Heights, Ill.

No Drawing. Application July 28, 1950,
Serial No. 176,547

3 Claims. (Cl. 167—93)

This invention relates to a dentifrice in paste form.

The use of dentifrices including dibasic ammonium phosphate and urea has heretofore been suggested. The inclusion of these materials in a paste which will have satisfactory shelf life without diminution in the effectiveness of the active ingredients has heretofore proved difficult.

I have found that the following composition overcomes these difficulties:

| | Percent |
|---|---|
| Tricalcium phosphate | 26.67 |
| Glycerine | 45.40 |
| Water | 15.40 |
| Flavoring (peppermint) | 0.58 |
| Gum tragacanth | 0.96 |
| Saccharin | 0.10 |
| Surface active agent (Nacconol LAL) | 2.89 |
| Diammonium phosphate | 5.00 |
| Urea, 100-mesh | 3.00 |

The Nacconol is essentially a sodium lauryl sulfoacetate.

The dibasic ammonium phosphate is in powdered form, preferably to the state of fineness known as "FF."

Other gums, such as karaya, may be substituted for all or part of the gum tragacanth.

The amount of water is varied to give the proper consistency to the paste, and the amount required will vary somewhat from time to time.

The foregoing detailed description is given for clearness of understanding only, and no unnecessary limitations should be understood therefrom as modifications will be obvious to those skilled in the art.

I claim:

1. A dentifrice comprising approximately 26.67% tricalcium phosphate, 45.40% glycerine, 15.40% water, 0.58% flavoring, 0.96% gum tragacanth, 0.10% saccharin, 2.89% surface active agent, 5.00% diammonium phosphate and 3.00% urea.

2. A dentifrice comprising approximately 26.67 parts of tricalcium phosphate, 45.40 parts glycerine, 15.40 parts water, 0.96 part gum tragacanth, 2.89 parts surface active agent, 5 parts diammonium phosphate and 3 parts of urea.

3. A dentifrice comprising approximately 26.67 parts of tricalcium phosphate, 45.40 parts glycerine, 15.40 parts water, 0.96 part gum, 2.89 parts surface active agent, 5 parts diammonium phosphate and 3 parts of urea.

JULIAN ROBERT SCHLAEGER.

REFERENCES CITED

The following references are of record in the file of this patent:

UNITED STATES PATENTS

| Number | Name | Date |
|---|---|---|
| 2,216,816 | Kuever | Oct. 8, 1940 |
| 2,218,172 | Kokatnur | Oct. 15, 1940 |
| 2,542,886 | Wach | Feb. 20, 1951 |

OTHER REFERENCES

Manufacturing Chemist, March 1950, page 106. 167/93A.